United States Patent
Borrel et al.

(10) Patent No.: US 7,889,210 B2
(45) Date of Patent: Feb. 15, 2011

(54) VISUAL INTEGRATION HUB

(75) Inventors: Paul Borrel, Cortlandt Manor, NY (US); William A. Tulskie, Jr., Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 11/831,319

(22) Filed: Jul. 31, 2007

(65) Prior Publication Data

US 2009/0033679 A1 Feb. 5, 2009

(51) Int. Cl.
G09G 5/00 (2006.01)
G06F 3/00 (2006.01)

(52) U.S. Cl. .................. 345/619; 715/748; 715/751; 345/1.1; 345/2.2

(58) Field of Classification Search .......... 345/619, 345/1.1, 2.2; 715/751, 748; 709/201–203, 709/217–219
See application file for complete search history.

(56) References Cited

U.S. PATENT DOCUMENTS

| | | | | |
|---|---|---|---|---|
| 5,107,443 A | * | 4/1992 | Smith et al. ................ | 715/751 |
| 5,337,407 A | * | 8/1994 | Bates et al. ................ | 715/751 |
| 5,339,389 A | * | 8/1994 | Bates et al. ................ | 715/751 |
| 5,446,842 A | * | 8/1995 | Schaeffer et al. ............ | 715/751 |
| 5,966,512 A | * | 10/1999 | Bates et al. ................ | 715/751 |
| 6,330,685 B1 | | 12/2001 | Hao et al. | |
| 6,425,016 B1 | * | 7/2002 | Banavar et al. ............. | 715/751 |
| 6,982,682 B1 | | 1/2006 | Kaulgud et al. | |
| 7,516,435 B2 | * | 4/2009 | Petunin et al. ............. | 715/751 |
| 2002/0085030 A1 | * | 7/2002 | Ghani ....................... | 345/751 |
| 2004/0075692 A1 | | 4/2004 | Matichuk | |
| 2005/0097440 A1 | * | 5/2005 | Lusk et al. ............... | 715/500.1 |
| 2007/0186157 A1 | * | 8/2007 | Walker et al. .............. | 715/751 |
| 2009/0100368 A1 | * | 4/2009 | Look et al. ................. | 715/775 |

* cited by examiner

*Primary Examiner*—Chante Harrison
(74) *Attorney, Agent, or Firm*—Whitham, Curtis, Christofferson & Cook, P.C.

(57) ABSTRACT

A plurality of applications are integrated in a system by merging three-dimensional (3-D) display data contributions from the respective applications into a single display scene using a visual integration hub. The respective contributions of display data may be separately manipulated to establish registration or relative positioning and then locked together such that the composite image may be graphically manipulated as a single object. Two-dimensional (2-D) data such as text or spreadsheets are imbedded in the image and manipulated in the same manner as 3-D objects. The hub allows transfer of graphic data between applications and conversion of the graphic data to the format of each respective application.

14 Claims, 6 Drawing Sheets

VISUAL INTEGRATION HUB

BACKGROUND OF THE INVENTION

1. Field of the Invention

The present invention generally relates to integration of multiple applications with which a user or any of a plurality of users may interact and, more particularly, to integration of multiple applications at the level of the user interface or visual display.

2. Description of the Prior Art

In today's highly networked data processing environment, digital content is likely to be widely distributed, either geographically or over a plurality of data processors and/or applications or a combination thereof. A typical application not only operates on data which may be captured by or provided for that particular application but typically relies on combining and operating on content from multiple owners and applications; which data is usually geographically distributed and encoded in diverse formats. For example, consider e-commerce applications (e.g. E-Bay™, Amazon™, etc.), virtual sales applications (e.g. residential real estate), or collaborative engineering applications (e.g. mechanical, seismic, military, etc.). In each of these cases, rich content in very diverse formats and owned by multiple parties must be integrated before it can be effectively utilized.

Most content integration approaches currently in use are performed at the data level; requiring data mapping across repositories and, frequently, the extraction, transformation and consolidation of data from multiple repositories. These operations usually engender a lag in the data revision cycle and such operations must usually be repeated whenever the primary data is altered before the new data is available to applications which require it.

Moreover, this approach requires integrating all of the applications that access the different pieces of data content and the provision of user interfaces to multiple users to allow manipulation (e.g. edit, display, create, etc.) of the data in a consistent manner. That is, in such a scenario, for two applications to be integrated, each application must be able to understand, read and write the content of the other application even though the applications generally are developed principally to interact with a user on a visual level. In other words, many diverse types of applications which, when created, may have been optimized for very different functionalities must be made not only compatible but substantially interoperable when they are integrated. Thus the integration has generally been performed at the data level and has required complex and frequent reprocessing of large volumes of data so that all data potentially needed by any application may be made available to it. It follows that, in such an approach to integration, processing power required to limit delays in making altered or newly captured data globally available is very substantial and often greater than the processing power required to support a single application which may be integrated in a system. Large amounts of storage are also required to maintain separate, synchronized (e.g. consistent in content) copies of data in different formats corresponding to respective applications and which requires significant additional processing and communication between applications and processors for management to assure that consistency is maintained between a potentially large number of sets of data.

Nevertheless, all of this complexity, processing and hardware should be substantially transparent to the user at a visual/graphic interface and, in many instances, full integration and sharing of all data among all applications forming a system is not needed in order to support sufficiently flexible and effective user interaction with the system.

SUMMARY OF THE INVENTION

It is therefore an object of the present invention to provide an apparatus and a technique for integrating applications more simply and which avoids much of the complexity, processing and hardware requirements of system integration at the data level.

It is another object of the invention to provide for integration of systems at the visual/graphic interface level to support simultaneous user interaction with multiple applications of a system, including the simultaneous input of data to multiple applications in the format required by each respective application.

It is a further object of the invention to provide for integration of multiple applications in a system which greatly reduces or even eliminates a need for communication and management between the applications.

In order to accomplish these and other objects of the invention, a method and visual integration hub for integration of a plurality of applications at a visual level by generating display data representing visual image output data of a plurality of applications are provided in which the method and visual display hub perform capturing visual image output data of each application, designating an application as a master application, manipulating a viewpoint of the visual output data of the master application to achieve registration or desired relative positioning with said visual data output of another application, and selectively locking the master application with another application such that a further manipulation of view point of a designated master application alters a viewpoint of other applications locked thereto to maintain the registration or desired relative positioning of applications which are locked.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
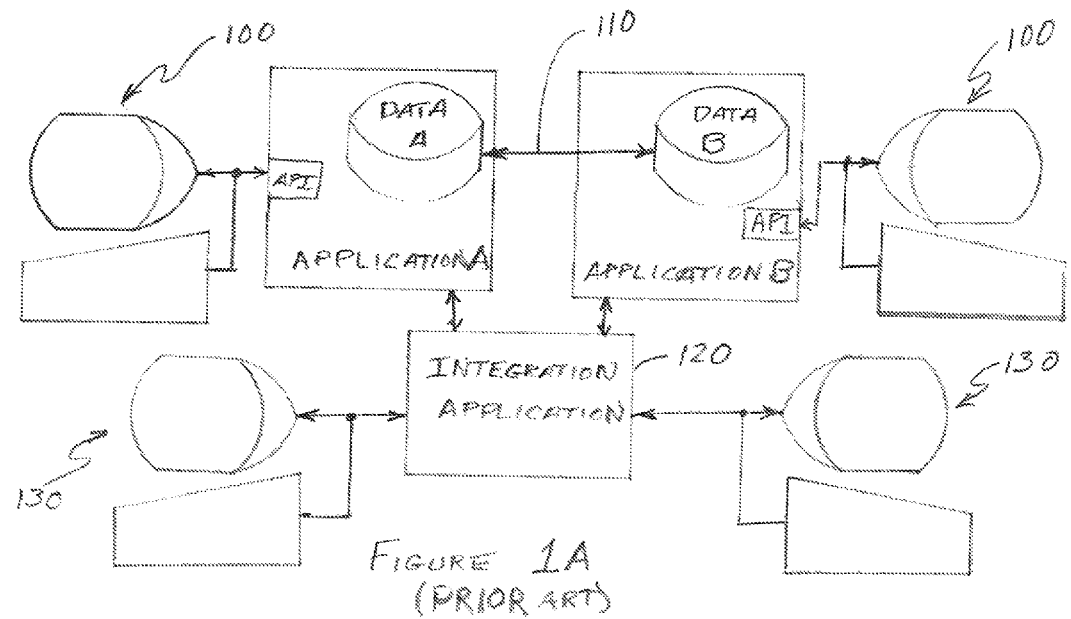
FIGS. 1A and 1B are high-level block diagrams illustrating traditional data level integration of applications and visual level integration of applications in accordance with the invention.

Referring now to the drawings, and more particularly to FIG. 1A, there is shown a high level block diagram representing the architecture of a system in which applications are integrated at a data level. While system integration at a data level is a traditional technique, FIG. 1A is arranged to facilitate comparison with FIG. 1B which is arranged an architecture for system integration at the visual level in accordance with the invention. Therefore, no portion of FIG. 1A is admitted to be prior art in regard to the present invention and is thus designated as "Related Art".

As alluded to above, the basic and generalized purpose of many systems is to allow interaction with one or more users and thus there are many domains of application in which system integration is only needed at the visual level and where the applications do not need to share data but only their respective visual outputs to form suitable images at the user interface. Sharing of visual data at the level of the user interface will thus be referred to hereinafter as visual integration.

Visual integration, as a distinct methodology, is thus a very powerful technique since it relieves the need for respective applications to communicate directly with each other and avoids the complexity of data level integration in domains of application where communication between applications would not contribute significantly to user interaction. Visual integration is thus a technique which, at base, substitutes the much more tractable problem of proper positioning (which may or may not involve one image covering of an image or portion of an image from one application with an image or portion of an image from another application; sometimes referred to hereinafter as occlusion) visual output from respective applications in the integration set (e.g. the set of applications which is integrated in a given system) for the much more complex and processing intensive processes required for data level or application level integration.

In this regard, it will be helpful throughout the following discussion of the invention, to recognize, as the inventors have done, that whenever the output of one or more applications contains three-dimensional (3-D) visual representations of physical artifacts (e.g. objects located in physical space, such as parts of an object respectively positioned in accordance with object and the like), registration between such physical artifacts is implicitly defined by the relative positioning of the artifacts themselves. Since many highly sophisticated techniques of 3-D rendering of such physical artifacts have been developed (the details of which are not important to the successful practice of the present invention), integrating 3-D visual content of plural applications then becomes well-defined and conceptually straightforward to implement, although the actual rendering of an image may be quite complex. Moreover, counter-intuitively, the registration of 3-D visual content can be "extended" to 2-D visual content (e.g. text, 2-D graphics, menus, icons and other display features which may be desirable or contrived to assist user interaction) by positioning such 2-D visual content in a 3-D context. In other words, the invention exploits the natural and implicit registration of visual representations of objects or portions of objects as the visual content integration mechanism. For this reason and the simplifications of implementation and utilization which flow naturally therefrom, visual integration is preferable to all other approaches to system integration in virtually all visually integrated application scenarios.

More specifically, the generalized architecture of data level integration illustrated in FIG. 1A involves a plurality of applications represented by application A and application B, each having its own data, represented by data A and data B, respectively, and each application supporting one or more user terminals 100 with which each application communicates. Each application shares data with each other integrated application as indicated at 110 and data conversion is achieved through use of an integration application 120 which also manages the operation and interaction of the respective applications, as alluded to above. Alternatively or in addition thereto, the integration application 120 may provide modifications of the functionalities of the respective applications such that the respective applications function together as a single application, referred to as application integration. Application integration may maximize system functionality but usually does so at a cost of even greater complexity and loss of efficiency than data level integration; which cost may be significant. One or more user terminals 130 may communicate with the system through the integration application, as well.

Figure 1B:
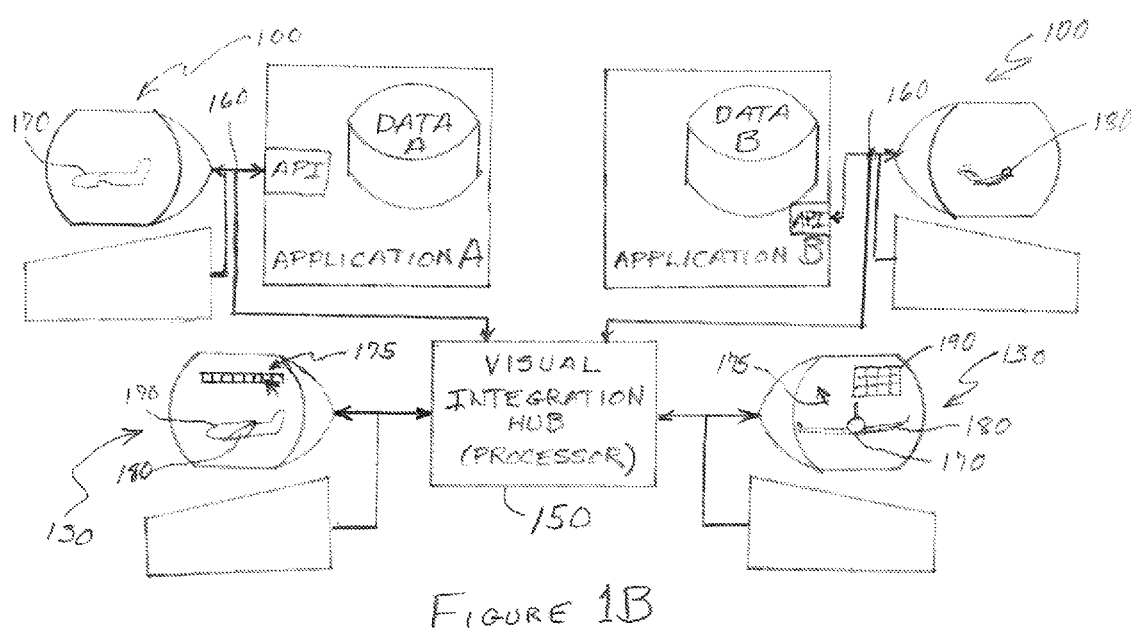

The basic conceptual architecture of visual integration in accordance with the invention is illustrated in FIG. 1B for comparison with data level integration illustrated in FIG. 1A. A principal differentiating feature of visual integration is the provision of a visual integration hub 150 and the simplification of communications by avoiding communications between applications (e.g. 110 of FIG. 1A) which avoids the complexities and management difficulties of data conversion and exchange implied by application integration or data level integration while allowing all user terminals to communicate with all applications through the hub 150 which, in turn, communicates with the respective applications, as needed. It should be appreciated that the basic communications between hub 150 and each of the respective applications are performed in precisely the same manner and using the same communicated data as would be the case where any given application is communicating with a dedicated terminal 100 as indicated by the connection at node 160 of FIG. 1B.

The visual integration hub 150 provides an environment to allow the applications to merge their 3-D visual outputs without a requirement for a direct connection for data and/or interactions among the applications. Thus the hub, as will be explained in greater detail below, allows each application to contribute a fraction of the total 3-D environment communicated by a display or the like to a user through a terminal dedicated to that application. For example, one application may contribute a 3-D view of the body 170 of an airplane while another application may contribute a 3-D view of the wings 180 as illustrated in connection with terminals 100 of FIG. 1B and the separate displays of airplane body and wings thus represent the function of dedicated terminals for the respective applications. If the two 3-D views (body and wings) are separately displayed, either sequentially or concurrently, the user can, of course, interact with either application through or in response to the respective, separate images. However, if the two 3-D views are properly positioned to be correctly registered with each other, the user will see an integrated image of the airplane body and wings and can interact with that composite (e.g. visually integrated) image and the corresponding application contributing that part of the composite image in a manner which is completely transparent to the user. In the great majority of domains of application, this transparent interaction with a plurality of applications will be substantially as powerful as a system which is integrated at a data level and will provide improved speed of response without any modification of functions within or communication between the respective applications.

Essentially, whenever one or more users wishes to combine the visual outputs of several applications, the visual integration hub 150 in accordance with the invention is an efficient, flexible alternative to traditional data level or application level integration approaches for most domains of application such as so-called virtual worlds (e.g. Second Life™), gaming, collaborative business interfaces and the like (which derive from the ability of the visual integration hub 150 to capture screen contents of existing applications and to reproduce them, through the visual integration hub, in environments that are different from the environments originally intended), engineering digital mock-up (e.g. automotive and aerospace engineering, architecture design, seismic exploration and the like), and health care and life sciences to combine information (e.g. concerning patients) that is distributed among, for example, insurance providers.

In such domains of application of visual integration, the respective applications, through the visual integration hub 150 in accordance with the invention, merge their 3-D visual output(s) (e.g. 160) while retaining their individual user interface(s). The display provided by an individual application may include a 3-D window where the 3-D visual output is rendered with interaction artifacts such as text or spreadsheet windows (e.g. 190), dialog boxes, menus, buttons, icons, cursors and the like (e.g. 175) which provide the user with mechanisms to interact with the application and provide feedback to the user (in addition to changes in the 3-D window image) for executed interactions. In practice, the 3-D windows result from calls to some 3-D application programming interface (API) within the application while the interaction artifacts are created and rendered on a display using other APIs.

It is important to an understanding of the present invention to recognize that, at any given time, the interaction artifacts displayed to a user are those of one of the applications of the system. The application providing the artifact with which the user is interacting at any given time or with which the user most recently interacted will be designated and referred to as a master application. It should also be understood that the master application, so defined, may be changed quickly and often by the visual integration hub 150 in response to user interaction with a portion of an integrated image or other user control. Such designation may be accomplished in any of a number of ways such as a register functioning as a pointer, as will be evident to those skilled in the art. The user can select any application as the master application but only one application may be designated as the master application at any given time. In other words, the portion of the integrated image with which the user may be interacting at any given time or with which the user interacted most recently may be used to select the application which is the master application until superceded by another master application selected in response to user action or interaction. This designation of the master application may be visualized as the portion of the integrated image contributed by any given application being, in essence, an icon for selection of that contributing application as the master application although no deliberate selection action by the user may be required. (As will be discussed below, it is preferred that each object or selected objects contributed by an application serve independently as icons for the application and that independent locking and unlocking functions be provided for each object or selected objects, at least to the extent of providing locking and unlocking for 2-D objects which is independent of locking and unlocking of 3-D objects as will be discussed below.) While the user interacts with any given master application, all resulting view point modifications will be applied to all other applications in order to maintain visual 3-D viewpoint integrity among applications.

When a user interacts with a master application, the viewpoints of other applications are thus "locked" to that of the master application. Therefore registration between the images resulting from the visual outputs of the respective applications, once initially achieved as will be discussed below, will be maintained throughout all viewpoint changes made through any application which is currently the master application. However, in some instances, as will be discussed below, the viewpoint of some of the applications can be unlocked so that their viewpoints are no longer tied to the viewpoint of the master application. This will result in having the image portion contributed by the unlocked application being fixed in location on the display for that user while the image provided by the master application and other applications locked thereto may be freely manipulated as a single object. However, the viewpoint of the unlocked application can be changed through mechanisms other than the interaction of the direct user with the visual integration hub 100. For example, actions of other users which are not connected through the hub can alter the viewpoint of the unlocked application. Locking or unlocking can represent different user behaviors with respect to the applications and can also be used to register the viewpoints of applications with respect to each other.

Figure 2:
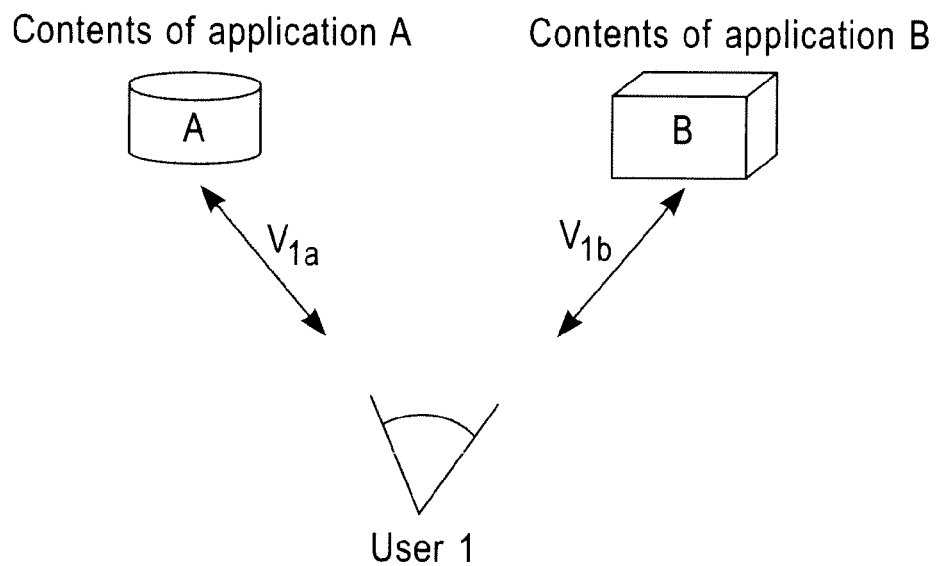
FIGS. 2, 3 and 4 illustrate control of display image manipulation for integration of applications at the visual level.
Figure 4:
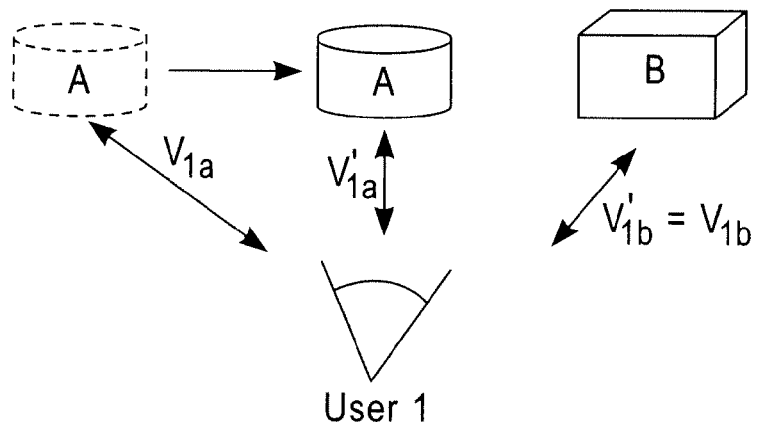

For example, in FIG. 2, the visual output or contents of applications A and B are represented by isometric views of a cylinder and a rectangular prism, respectively. A user, designated "User 1" is represented by a stylized "eye" and the viewpoints of the contributions of applications A and B are represented by double arrows labeled V$1a$ and V$1b$ (each of which represents a more or less complicated expression of a distance and direction in three dimensions, depending on the algorithm used in each respective application), respectively. Then, if application A is the master application and application B is locked thereto, when the user changes the viewpoint of A from V$1a$ to V'$1a$, the viewpoint of application B will be correspondingly changed from V$1b$ to V'$1b$=V$1b$+(V'$1a$−V$1a$). If, on the other hand, if application B is unlocked and the same change of viewpoint of application A is performed, no change occurs in the position of the image portion contributed by application B, absent some other control being exercised, as alluded to above. Thus, the scenario depicted in FIG. 4 may be used to bring image portions A and B into desired registration or relative positioning with each other by manipulation of either application functioning as the master application and the other, unlocked application then locked. The relative position (possibly including occlusion to some degree, as illustrated on the lower left monitor 130) will then change together regardless of which application is used as the master application to control the viewpoint change.

It is important to an appreciation of the meritorious effects of the invention to realize that the relatively simple manipulation to produce registration or relative positioning of the image contributions is the basic and possibly most complex operation required from the visual integration hub 150 in accordance with the invention. For example, when a new application is connected to a visual integration hub 150, the new application may be entered as an unlocked application and the previous composite image brought into registration with the new application or, alternatively, the new application can be entered as a master application (with all other applications unlocked or locked to each other) and brought into registration with the current/previous image or composite image.

There may be many possible collaborative scenarios where only one active user drives and controls changes in the visualization while other (inactive) users are simply observers although different displays may be used for each observer or group thereof. In such a case, the active user and the observers all share the same view created from the contributions of visually integrated applications by the hub 150.

In other scenarios, however, it may be required or desired that different active users have respective, different viewpoints of the composite 3-D output of the applications as illustrated on terminals 130 of FIG. 1B. This scenario could be achieved by having a plurality of visual integration hubs 150, one for each active user, where each hub 150 creates a different view of the 3-D visual outputs. Also, in such a scenario, each user can interact with a potentially different master application to represent different behaviors. As will be described below, the visual integration hub 150 in accordance with the invention accommodates all possible combinations of users, observers and applications with no constraints. It is assumed for purposes of the following discussion that the interactions of the user can be coordinated through some usage scenario or mechanism that avoids conflicts when more than one user selects the same master application for interaction. Such a scenario or mechanism is not at all critical to the practice of the invention and many suitable arrangements will be apparent to those skilled in the art, such as deadlock prevention mechanisms, priority arbitration mechanisms and the like, some of which may be provided in the respective applications if the respective applications have the capability of concurrently servicing multiple users and presenting a different viewpoint to each user.

When several applications contribute their respective visual outputs to the visual integration hub 150, there is an implicit relative positioning relationship created in the visual integration hub between their 3-D contents as in the example of wings and body of an aircraft discussed above. When an application is unlocked, any change in viewpoint in the master application (whichever application may be the master application at any given time) results in a change of relative position between the contents of any unlocked application and the master application. When there are multiple active users, any such change is recorded by the visual integration hub and applied to all viewers regardless of which application each user may have selected as the master application.

Figure 5:
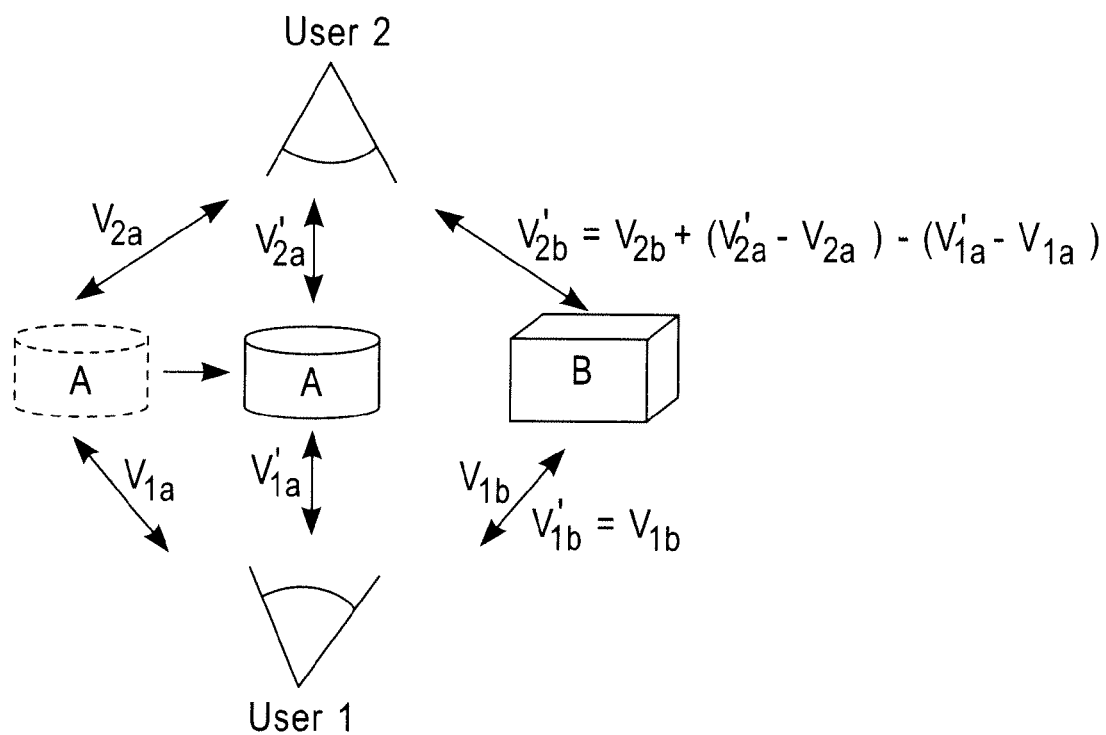
FIG. 5 illustrates simultaneous providing of different viewpoints to different users in accordance with the invention.

For example, as shown in FIG. 5, two users, User 1 and User 2, are connected to the hub. For User 1, application A is the master and application B is unlocked. The change of relative position between image portions/contributions A and B that results from the interaction of User 1 is reflected in the viewpoint of User 2 of application B to maintain scene consistency. Scene consistency is maintained regardless of the selection of master application and/or unlocked applications by User 2. When a new user is brought in to the visual integration hub 150, it first inherits the same viewpoint as the last user brought in. The new user then can become independent and selects a master application and navigates to obtain a specific desired viewpoint on the common 3-D scene.

In order to provide each user with a different viewpoint on the visual outputs of the applications as depicted in FIG. 5, each application must generate a different picture of its visual outputs for each user. One possible implementation meeting such a condition is to maintain a separate instance of each application for each user. All instances of an application would share a unique internal state and would only differ by the viewpoints they use to create as many different images of their common 3-D visual outputs as there are active users. However, multiple instances of applications are not required to support multiple users if the applications are able to contribute their 3-D contents to the visual integration hub 150; in which case the 3-D content would be rendered multiple times with potentially different viewpoints by the visual integration hub 150 for the respective multiple users. It is thus preferred that an intercept mechanism be provided which intercepts calls of the applications to 3-D graphics APIs and modifies the execution of these calls. Thus, the visual integration hub 150 is made transparent to the respective applications which still make calls to a graphic API as if operating in a stand-alone manner while additional functionality is provided in the implementation of the graphics API, itself.

In discussing the operation of the invention, it is important to understand that, for an application to participate in the visual integration hub 150 in accordance with the invention, an application must generally perform two specific functions: communicate its viewpoint to the visual integration hub 150 and communicate depth buffer information of its 3-D contents as seen from a given viewpoint to the visual integration hub 150. (Each pixel of the visual information contains a depth information.) However, in many cases, these requirements can be performed transparently to the applications through the 3-D API intercept mechanism which is preferably provided by the hub and will be described in detail below.

It is to be understood that each user connected to the visual integration hub 150 sees an image that is built by merging the visual outputs provided by all applications in accordance with the viewpoint selected by individual users through the master application selected by the user. The visual integration hub merges the 3-D visual outputs by combining the depth buffers (an array of pixels that contains depth information at each pixel) that results from rendering the 3-D contents of the applications so as to correctly account for any occlusions among these contents from different viewpoints; one for each active user.

Images for each of the users are created using the following pseudocode algorithm:

```
/* declaration: a data structure to store all viewpoints*/
/* V_{i,j}= viewpoint of user i on 3-D contents of application j*/
/* declaration: a data structure to store all depth buffers*/
/* B_i= depth buffer of 3-D contents as seen by user i*/
do forever {
    for each user i {
        a = master application of user i
        δ?= V_{i,a}- getviewpoint (i,a)
        B_i= getbuffer (i,a)
        for each application j≠a {
            if application j is locked {
                setviewpoint (i,j,getviewpoint (i,j)+δ)
            }
            else{
                for each user k ≠ i{
                    setviewpoint(i,j,getviewpoint(k,j)-δ?)
                }
            V_{i,j}= getviewpoint(i,j)
            B_i=compose(B_i,getbuffer(i,j))
        }
        displaybuffer(B_i)
    }
}
```

Figure 8:
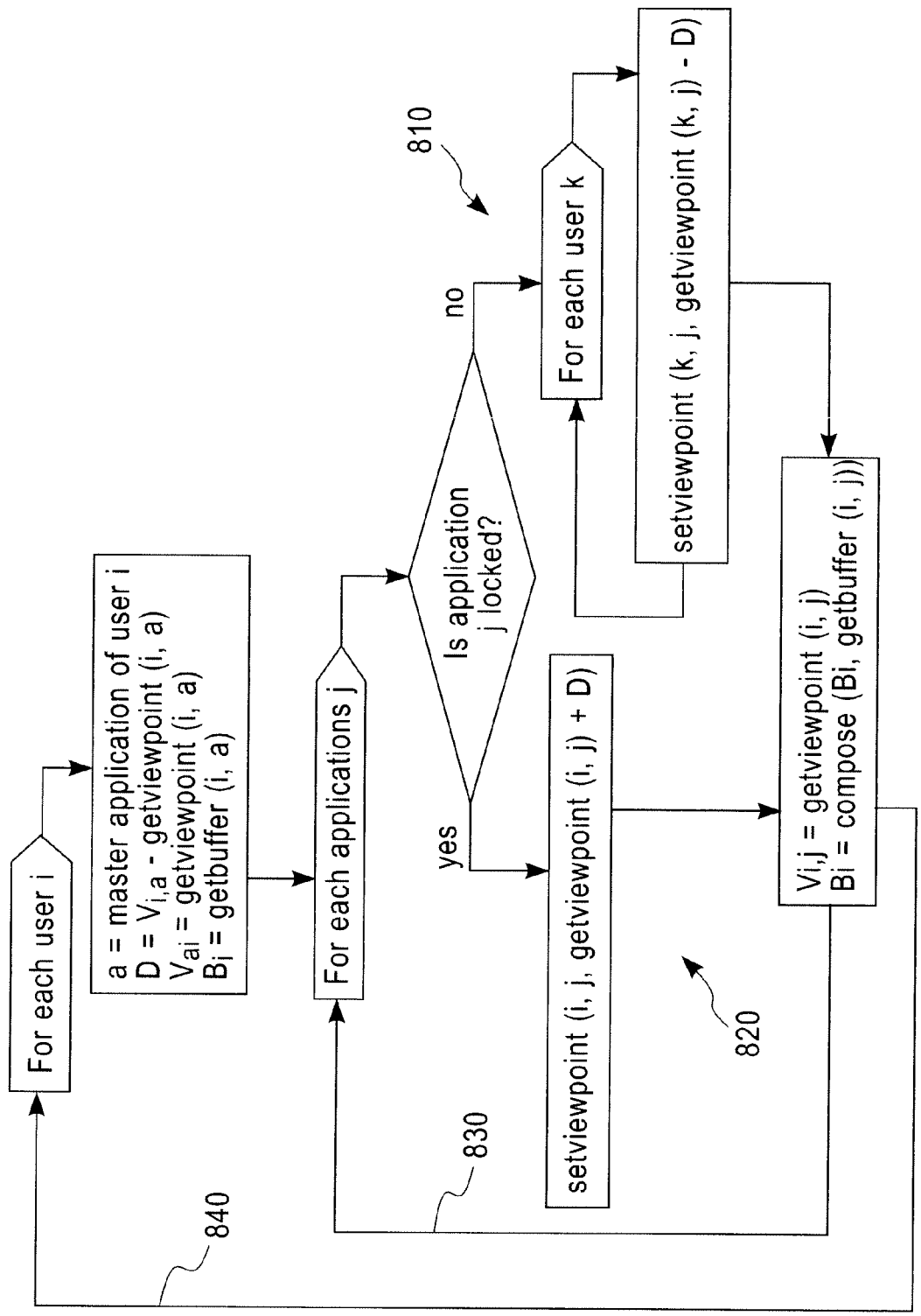
FIG. 8 is a flow diagram illustrating processing for developing an individual viewpoint for a user of a visually integrated display in accordance with the invention.

It should be appreciated that the above, relatively simple algorithm (a flow chart for which is illustrated in FIG. 8 showing alternative processes 810 and 820 in a loop 830 for iterating through applications nested in a further loop 840 for iterating through active users) allows the visual integration hub 150 to be implemented with a single suitably programmed general purpose data processor of modest processing power (depending on required response time and the number of active users and number of applications to be accommodated) together with suitable input buffers and display screen memory. The details of such an implementation are not critical to the successful practice of the invention and could be implemented in many ways which will be apparent to those skilled in the art in view of the description of the invention and its perfecting features herein.

The above algorithm assumes that the visual integration hub 150 can communicate with the applications to request contents of the depth buffer under a given viewpoint and to query the current view point. In practice, this functionality can be implemented by intercepting the calls that the applications make to the graphic API that creates and maintains the display buffer and a representation of the viewpoint as the application would do in a standalone circumstance. The intercept mechanism, for example, can perform such an operation to obtain data which fully defines the 3-D environment of a respective application which is defined by the image generated by the application (e.g. the scene, viewpoint and depth information) rather than only a 2-D rendering of that 3-D environment from a particular viewpoint.

This method allows the applications to be unchanged and still participate in the visual integration hub 150 since the hub can thus maintain a separate representation of the graphics state of each application. This graphic state is modified by the application (e.g. when a new object is created or when a master application changes its viewpoint through interaction with a user) and is used by the visual integration hub 150 to generate the correct pictures under the correct viewpoint for each active user in a manner transparent to the application. As alluded to above, this mechanism avoids any requirement for having multiple instances of each application, one for each active user, since the graphic state can be generated or created for each user as illustrated in FIG. 6.

Figure 6:
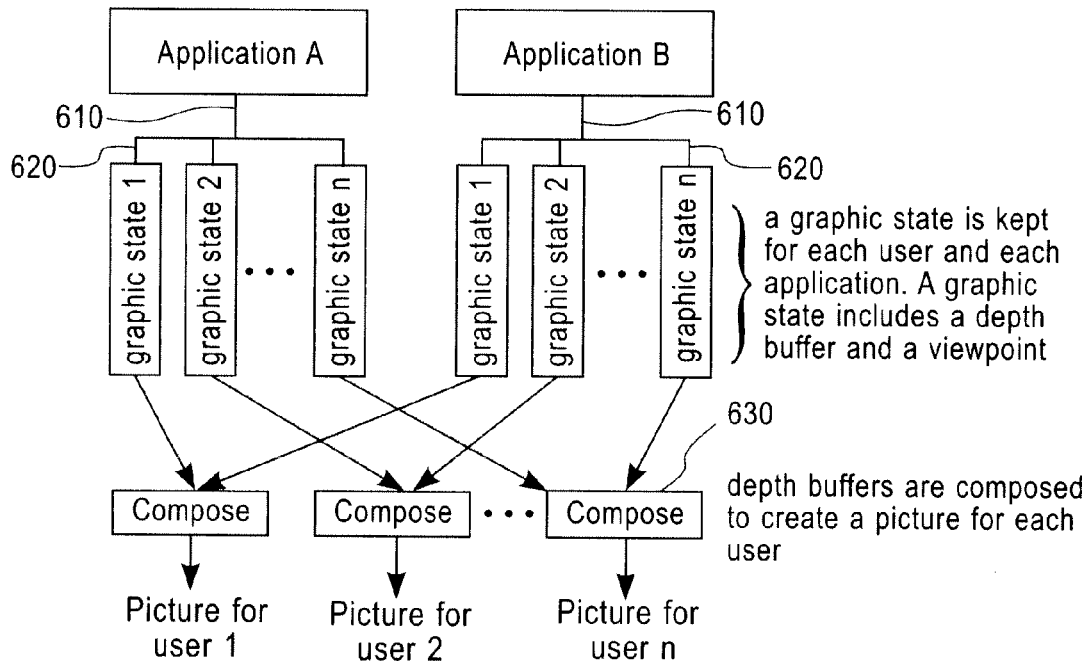
FIG. 6 is a block diagram illustrates an architecture for the visual integration hub which supports maintaining a separate graphic state for each application and each user.

Specifically, as shown in FIG. 6, each application has a visual content output 610. The connection(s) indicated at 620 represents the graphic API intercept mechanism which captures and stores in a distributed fashion a separate graphic state for each user. The graphic states of the respective applications can then be collected in accordance with each individual active user and a composite, integrated image composed from the depth buffers such that a separate and independently manipulable image with a potentially independent viewpoint is provided to each active user as illustrated at 630 of FIG. 6. It can be readily appreciated that no modification of the applications is required while the details of the composition operations and hardware 630 are unimportant to the successful practice of the invention; for which many suitable implementations thereof will be apparent to those skilled in the art. Thus, while other architectures (e.g. using separate instances of each application for each user or using separate visual integration hubs for respective users, as alluded to above) could be employed in the practice of the invention, the relatively simple organization of FIG. 6 is much preferred.

Figure 3:
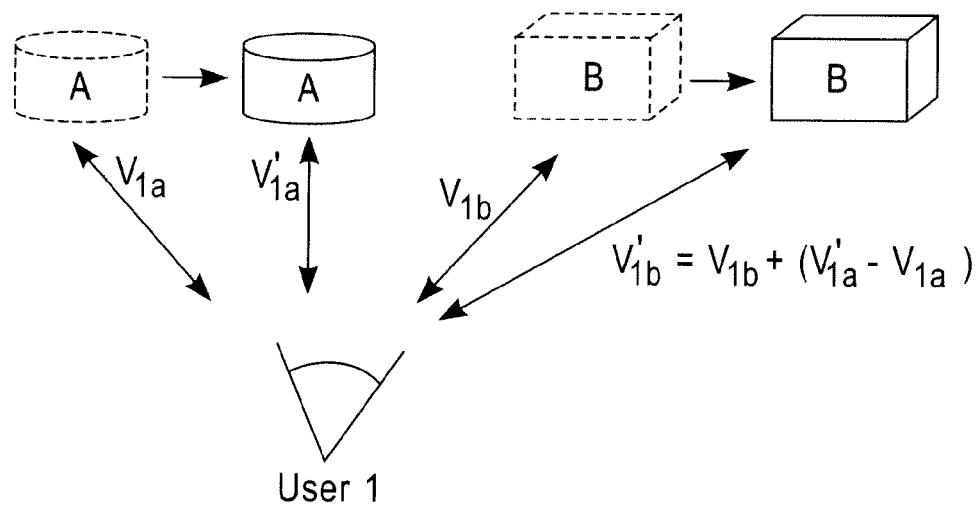
Figure 7:
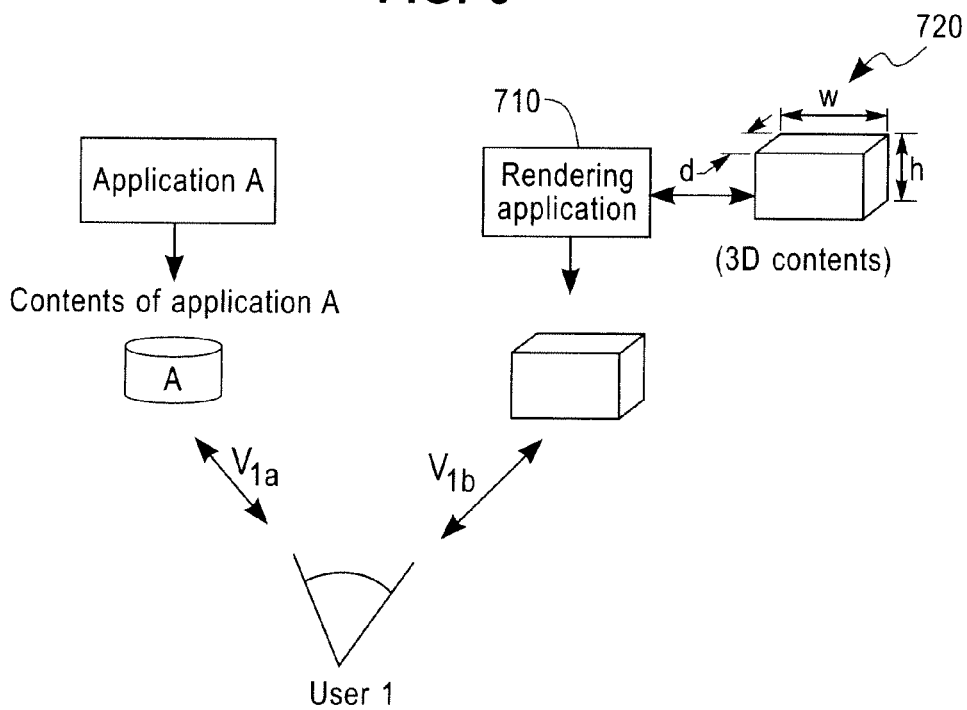
FIG. 7 illustrates bi-directional communication of data in three dimensions through a rendering application.

It is often the case that the only role of an application in connection with visual integration hub is to add content to a 3-D scene and applications may be integrated with which no user has a need to interact. In such a case, it can be advantageous to communicate the 3-D content only once to be merged in the scene to the output of an application whose sole role is to render content for display when needed. Such an application does not have any user interface but otherwise plays the same role as other applications with respect to the visual integration hub 150. For example, as shown in FIG. 7, in which a rendering application 710 has been substituted for an application in regard to particular 3-D content 720. The arrangement depicted in FIG. 7 is otherwise substantially the same as FIG. 2 and the manipulations illustrated in FIGS. 3 and 4 can be performed as described above. That is, known rendering applications can accommodate changes of viewpoint in the same manner as would be performed by an application.

As a perfecting feature of the invention, it is sometimes desirable to display text, spread sheets and other data which would be more naturally depicted in a two-dimensional (2-D) form, as generally depicted at 190 of FIG. 1B. Such data can simply be imbedded in the 3-D environment processed as described above and can result in concatenation of 2-D data objects from each of the applications visually integrated in accordance with the invention and allow manipulation of the 2-D data as a single composite object by appropriate use of locking and unlocking of respective applications which may be slightly different than for 3-D objects such as by changing screen position of 2-D objects (which may be composite objects that are locked together) without changing viewpoint or perspective. It should be appreciated, for purposes of such manipulations, that it is desirable to provide for selective locking and unlocking between 2-D objects separately from locking and unlocking of 3-D objects while allowing locking and unlocking of 2-D objects with 3-D objects.

In order to provide appropriate and convenient display of 2-D data in a manner consistent with the display of 3-D data, it is preferred to embed the composed (e.g. as it would be formatted for a printer) 2-D data from each application as a separately manipulable object with the 3-D data which is captured by interception or otherwise. It is preferred that manipulation of at least size and position be provided for each such 2-D object to allow image adjustment for proper relative positioning (possibly with occlusion as in overlaid windows) with corresponding 2-D data objects from other applications (e.g. to dimensionally match respective portions of a spread sheet or to juxtapose portions of text for editing). At, for example, the composition operation or hardware of FIG. 6, the 2-D data can be composed and thereafter processed and the display controlled as one or more separately manipulable individual or composite objects; each individual or composite object having a separate viewpoint which may or may not be the same as the viewpoint for the composite or separate 3-D data although the user could maintain some or all of the 2-D data from respective application separate and independent from other 2-D data from the same or other applications.

In this regard, size of the display of 2-D data can be manipulated in the same manner as control of depth of 3-D data. Position can be as readily manipulated in two dimensions as in three dimensions as long as the object containing the 2-D data can be independently positioned in three-dimensional space. Separate manipulation of 2-D objects can easily be provided by simply providing locking and unlocking arrangements for the 2-D data objects of each application which are separate and independent from the 3-D data objects. It is also preferable that a 2-D data object from a given application can be designated as a master application while providing for 3-D objects to be unlocked therefrom. Thus, the locking and unlocking mechanisms and operations discussed above in connection with FIGS. 2-4 provide complete flexibility to compose 2-D data with the principal operational differences being that, once composed into a composite data object or 2-D data from respective applications are suitably positioned by the user, the 2-D data would preferably remain unlocked and thus stationary on the display during manipulation of 3-D data which is presumably locked with other 3-D data to be manipulated together, as described above. Also, as with the rendering application 710 of FIG. 7, discussed above, some applications which contribute only 2-D data may be integrated, through the invention, with 3-D data from other applications in the same manner as with rendering application 710.

Figure 9:
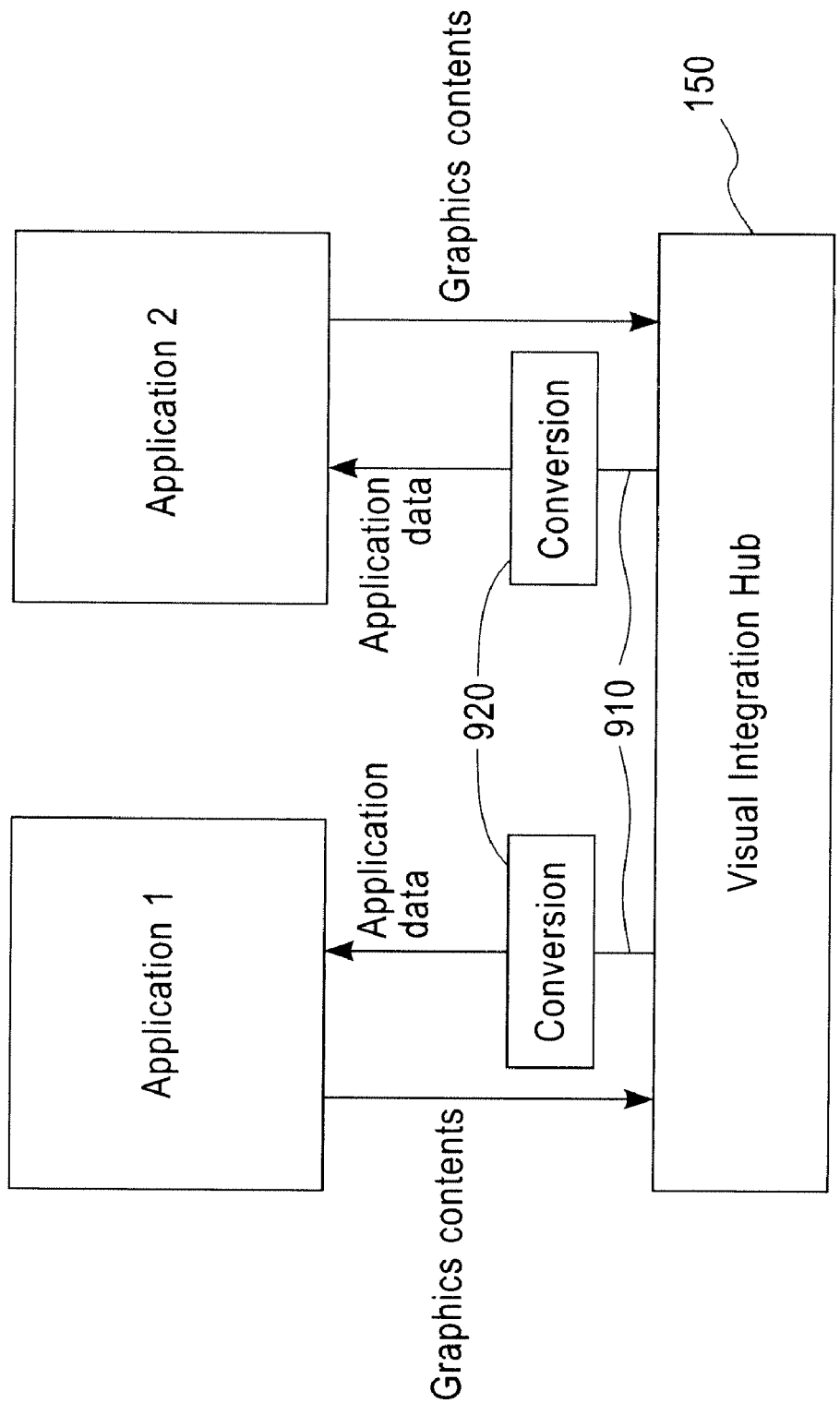
FIG. 9 is a block diagram illustrating transfer of data between applications in accordance with a perfecting feature of the invention.

As another perfecting feature of the invention, the visual integration hub 150 can also provide for communication of data between applications as illustrated in FIG. 9. As described above, a user may interact with any particular application and such interaction also serves to designate that application as the master application. The interaction itself may be simply for manipulation of the display of the contribution of the master application and all other applications which are locked to it as described above but can also alter data of the master application and thus can also potentially alter data of other applications, as well. Achievement of this latter functionality is facilitated by the fact that data representing the graphic states of the various applications is available in several different forms (e.g. graphics, text code, graphic primitives and the like) in whatever processing is used for performing composition 630 (FIG. 6) of the display scene of the merged data in visual integration hub 150 and the altered or newly input data will generally be present in all or most of the different forms required for the display; any of which can be captured and returned to any desired application which is integrated in the system through use of the visual integration hub 150 in accordance with the invention. That is, graphics as displayed at any given time can be captured by any application at the will of a user or automatically by an application from the visual integration hub in the same manner as a user would supply graphical input to the application itself or transfer to the application from a database as depicted at 910 of FIG. 9. This capability is clearly applicable to all displayed objects, regardless of whether they are 3-D or 2-D data (while both would be handled as 3-D data by the visual integration hub 150).

Thus, the principal difficulty in using the invention for input of data into any or all applications or transfer of data between applications (insofar at the data may be useful in a particular application) is not the input or transfer of the graphic or image data to particular applications but management thereof to maintain data integrity and many suitable arrangements for performing such management are known in the art. It should be recognized that the functionality of this perfecting feature serves to provide most of the functionality of systems which are integrated with much greater complexity at the data level or application level. Such a functionality, using only graphic or image (e.g. bit map) data could allow, for example, a composite spread sheet to be formed and the entire composite spreadsheet object associated with or transferred to an application other than the application(s) from which it was originally derived. Thereafter, the spreadsheet object could be retrieved and displayed from the application to which it is transferred without a need to invoke the original application(s). Moreover, such transfer of graphic data between applications may be performed in substantially real-time and only on an as needed basis without the complexities of translation, re-formatting, re-mapping and the like required in more complex approaches to system integration such as data or application level integration even though such data can be manipulated only graphically and without change of view point in the application. However, viewpoint could be altered in the course of rendering by the visual integration hub 150 when the graphic data is returned by the application to which it was transferred. In other words, data captured from another application as graphic data can be reproduced in the same form by any application which captures it while still allowing for some useful manipulations such as freely positioning 2-D objects.

As yet another perfecting feature of the invention in this latter regard, data captured in a graphic form can be converted to data in a format such that viewpoint manipulations and alteration of data underlying display of data as a 2-D object may be processed by the application to which the data is transferred. Thus, the application which captures data is not limited to the mere reproduction of the captured data. In theory, such a conversion, generally illustrated at 920 of FIG. 9, could be accomplished by using the inverse(s) of the data transformation(s) used to generate the composite display from the visual data contributions of the respective applications. In practice, however, other expedients may be more convenient and straightforward.

For example, character recognition techniques well-known in the art can be applied to the graphic display bit map of 2-D data in precisely the same manner (and with potentially greater accuracy) as optical character recognition operates on a bit map derived through scanning of, for example, a document. Pixels of graphic data depicting a 3-D environment in a 2-D form which are captured from, for example, a display/refresh buffer of the visual integration hub or display interface driven thereby can be used to interrogate the depth buffer of the corresponding graphic state register (FIG. 6) which contributed the pixel in order to obtain depth data and thus recreate the 3-D environment in the format of any arbitrary application. By virtue of this further perfecting feature of the invention, data can be suitably transferred between applications and converted into a format suitable for the application that captures the data. A relatively high degree of data level integration can thus be performed in a potentially transparent manner through visual level integration in accordance with the invention.

In view of the foregoing, it is seen that visual integration in accordance with the invention provides an extremely simple simulation of system integration at a more fundamental level such as application level or data level integration which nevertheless allows virtually all capabilities thereof while achieving improved performance and response speed. Moreover, visual integration is appropriate for most environments where no alternative to more fundamental level integration has been previously required as well as other domains of applications which have not justified the cost of more complex system integration.

While the invention has been described in terms of a single preferred embodiment, those skilled in the art will recognize that the invention can be practiced with modification within the spirit and scope of the appended claims.

The invention claimed is:

1. A visual integration hub for generating display data representing visual image output data of a plurality of applications, said visual integration hub comprising means for capturing said visual image output data of each application of said plurality of applications, each said application having its own respective application program interface (API)

means for designating an application of said plurality of applications as a master application, means for manipulating a viewpoint of said visual output data of said master application to achieve registration with said visual data output of another application of said plurality of applications, said respective visual output data being provided to said HUB via said respective API, and means for selectively locking said master application with said another application such that a further manipulation of view point of a designated master application alters a viewpoint of other applications locked thereto to maintain said registration of applications which are locked.

2. A visual integration hub as recited in claim 1, wherein said visual image output data of an application represents a portion of a three-dimensional environment including an object or portion of an object.

3. A visual integration hub as recited in claim 2, wherein said visual image output data includes an object representing two-dimensional display data.

4. A visual integration hub as recited in claim 1, wherein an application is designated as a master application by selection or manipulation of a portion of an object contributed by said application.

5. A visual integration hub as recited in claim 1 wherein said means for capturing includes
   intercept means for capturing said visual image output data from an application of said plurality of applications with different viewpoints corresponding to respective users.

6. A visual integration hub as recited in claim 1, further comprising
   means for capturing visual image data representing a portion of an object contributed by an application and transferring said visual image data to another application.

7. A visual integration hub as recited in claim 6, further comprising
   means for converting said visual image data representing a portion of an object to coded data in a format compatible with said another application.

8. A data processor implemented method for integration of a plurality of applications at a visual level by generating display data representing visual image output data of a plurality of applications, said method comprising steps of
   capturing said visual image output data of each application of said plurality of applications by means of a visual integration HUB implemented on a data processor, each said application having its own respective application program interface (API),
   designating an application of said plurality of applications as a master application by means of said visual integration HUB,
   manipulating by means of said visual integration HUB a viewpoint of said visual output data of said master application displayed on one or more terminals to achieve registration with said visual data output of another application displayed on one or more terminals of said plurality of applications, said respective visual output data being provided to said HUB via said respective API, and
   selectively locking said master application with said another application by means of said visual integration HUB such that a further manipulation of view point of a designated master application alters a viewpoint of other applications locked thereto to maintain said registration of applications which are locked.

9. The method as recited in claim 8, wherein said visual image output data of an application represents a portion of a three-dimensional environment including an object or portion of an object.

10. The method as recited in claim 9, wherein said visual image output data includes an object representing two-dimensional display data.

11. The method as recited in claim 8, including the further step of
    designating a master application by selection or manipulation of a portion of an object contributed by said application.

12. The method as recited in claim 8, wherein said capturing step includes a step of
    intercepting said visual image output data from an application of said plurality of applications with different viewpoints corresponding to respective users.

13. The method as recited in claim 8, comprising a further steps of
    capturing visual image data representing a portion of an object contributed by an application, and
    transferring said visual image data to another application.

14. The method as recited in claim 13, comprising the further step of
    converting said visual image data representing a portion of an object to coded data in a format compatible with said another application.

* * * * *